(No Model.)
J. HERRING.
FRUIT GATHERER.
No. 459,467.
Patented Sept. 15, 1891.
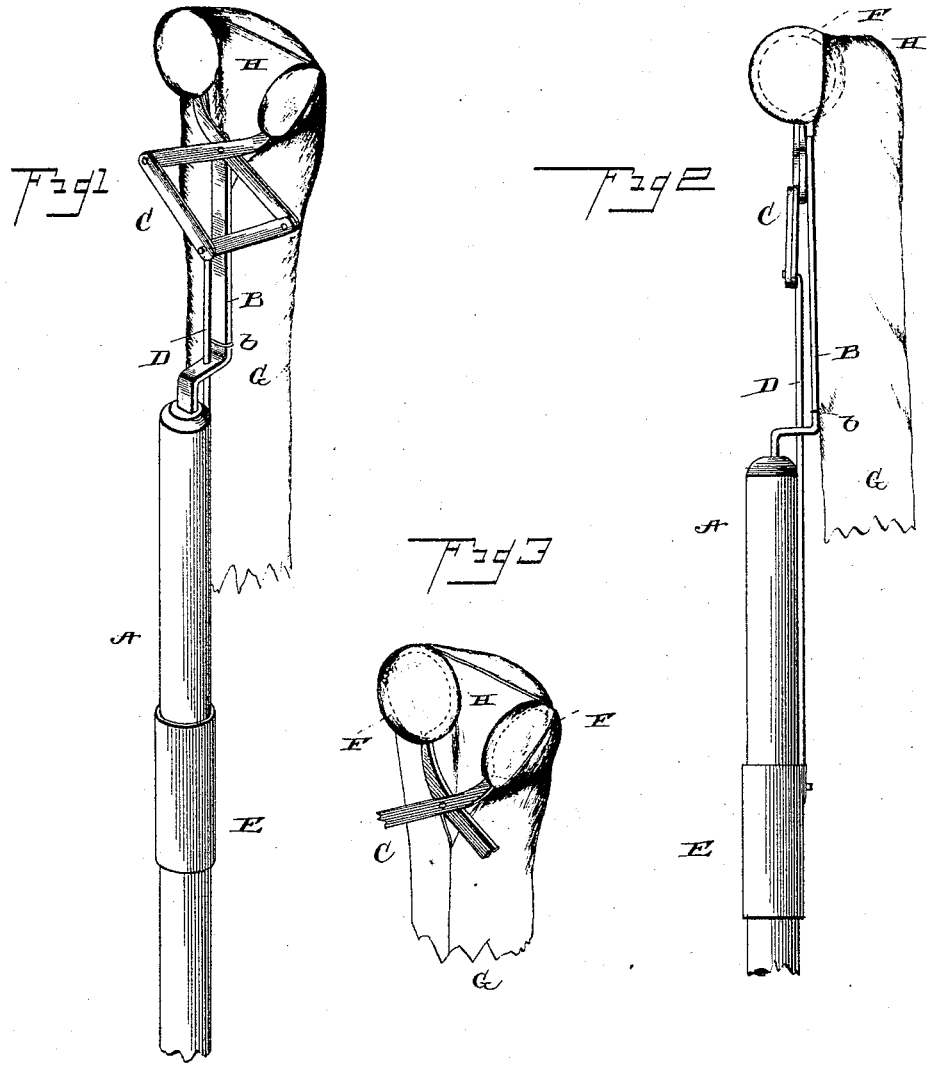
Witnesses
John Tourie
[signature]
Inventor
Joseph Herring,
By his Attorney
J. R. Littell

UNITED STATES PATENT OFFICE.

JOSEPH HERRING, OF POMONA, CALIFORNIA.

FRUIT-GATHERER.

SPECIFICATION forming part of Letters Patent No. 459,467, dated September 15, 1891.

Application filed March 12, 1891. Serial No. 384,704. (No model.)

*To all whom it may concern:*

Be it known that I, JOSEPH HERRING, a citizen of the United States, residing at Pomona, in the county of Los Angeles and State of California, have invented certain new and useful Improvements in Fruit-Gatherers; and I do hereby declare that the following is a full, clear, and exact description of the invention, which will enable others skilled in the art to which it appertains to make and use the same.

This invention relates to an improved fruit-gatherer, and has for its object to provide a device which will quickly and easily remove the fruit from the tree without bruising the same and safely convey it to a basket or sack carried at the operator's side or otherwise arranged.

With these objects in view my invention consists in the peculiar construction of the various elements and their novel combination or arrangement, as will be more fully hereinafter shown in the accompanying drawings, set forth in the description, and pointed out in the appended claim.

In the drawings forming a part of this specification, Figure 1 is a perspective view of my improved gatherer as applied and used. Fig. 2 is a side view of the same. Fig. 3 is a detail view of the gatherer proper and hood of the conveyer.

In carrying out my invention I employ a handle A, of any suitable length, and in the upper end of said handle is secured a metallic bar B, said bar being bent outward and upward a short distance above the end of handle, as clearly shown, thus throwing the greater portion of the bar beyond the line of handle.

A lazy-tong arrangement C is pivoted to the upper end of the bar B, and to the lower end of the lazy-tongs is attached the rod D, the upper end of said rod being bent at right angles to the length of rod, and forms the pivot for the lower end of lazy-tongs. The rod D is passed down through the horizontal portion of bar B, and is connected at its lower end to a sliding collar E, arranged upon the handle A.

Rings F F are arranged upon the upper free ends of the lazy-tong arms, said rings being arranged at right angles to the plane of the lazy-tongs and opposite each other. The rings F F are entirely covered with cloth, as clearly shown, whereby when the collar E is slid down, operating rod D and lazy-tongs C and springing the rings upon the fruit, the cloth will form a pocket to receive the fruit, and the metallic portions will not be brought in contact with the fruit to injure the same.

G indicates the conveyer or chute, which is secured to the picker at its upper end by attachment to the cloth covers for the rings, and it is also attached to the bar B, as at *b*. The lower end of the conveyer enters a sack or basket carried by the operator, and the upper end of the conveyer is formed into a hood H, which aids in directing the picked fruit into the conveyer.

In operation a basket or sack is carried at the operator's waist, into which the lower end of the conveyer is introduced. The handle is carried in one hand, the other hand being placed upon the sliding collar. When any fruit is desired to be picked, the collar is slid up, thus opening the covered rings or jaws of the picker. The fruit is then introduced between said jaws, and by sliding the collar down the jaws will be brought together and a firm grip had upon the fruit without injuring the same. Then by a slight pull the fruit can be severed from the tree, and by opening the jaws and slightly inclining the device the fruit will drop into the conveyer and be guided into the sack or basket, and it will be observed that as a hood H is formed upon the upper end of the conveyer and said hood is attached to the jaws, that by opening the jaws the top of the hood is drawn in or down, thus bearing on the fruit as it is released and aiding in directing it into the conveyer.

Having thus described my invention, what I claim is—

In a fruit-gatherer, the combination, with a handle, of a bar secured in the upper end of the same and having an offset portion, the lazy-tongs pivoted to the upper end of the offset portion, the sliding collar, the hand-rod passing through the bar, connected at its lower end with the collar and at its upper end with the lazy-tongs, the covered rings, the conveyer, and hood, all arranged and operating as described.

In testimony whereof I affix my signature in presence of two witnesses.

JOSEPH HERRING.

Witnesses:
A. E. HOSKINSON,
I. J. MANLEY.